United States Patent [19]
Paturzo

[11] Patent Number: 5,823,869
[45] Date of Patent: Oct. 20, 1998

[54] EXTENDABLE AIR NOZZLE FOR USE WITHIN A VEHICLE'S INTERIOR

[76] Inventor: Renato Paturzo, 14200 NE. 171st St., Ste G-208, Woodinville, Wash. 98072

[21] Appl. No.: 916,599

[22] Filed: Aug. 22, 1997

[51] Int. Cl.$^6$ ........................................................ B60H 1/34
[52] U.S. Cl. ................................. 454/152; 344/90; 344/97
[58] Field of Search ................................. 454/143, 152, 454/156; 34/90, 91, 97, 104

[56] References Cited

U.S. PATENT DOCUMENTS

| | | |
|---|---|---|
| 1,642,292 | 9/1927 | Becker . |
| 1,778,882 | 10/1930 | Becker . |
| 2,048,217 | 7/1936 | Peterson .................................. 34/90 X |
| 2,526,923 | 10/1950 | Alessandro . |
| 3,280,896 | 10/1966 | Goodson et al. ........................ 34/90 X |
| 3,383,778 | 5/1968 | Goodman ..................................... 34/90 |
| 3,555,699 | 1/1971 | Nelson ........................................ 34/97 |
| 4,195,416 | 4/1980 | Hall ......................................... 34/97 X |
| 4,700,049 | 10/1987 | Rubin ..................................... 34/97 X |
| 5,358,178 | 10/1994 | Crocker . |

*Primary Examiner*—Harold Joyce
*Attorney, Agent, or Firm*—Paul L. Griffiths

[57] ABSTRACT

In a vehicle, a self-retracting and extensible air duct in combination with an air distribution system and a nozzle for allowing the use of a treated air-stream at remote locations with a vehicle's interior. Heated air can be used to dry objects such as boots and clothing, or an occupant's hair. Cooled air can be directed directly on an object or in a specific area such as where the sun may be shining in. A connection is made to a vehicle's existing air distribution system with an air duct connecting the system with a receptacle in either the dashboard or the center console. Inside the receptacle is an air conduit storage area and a receiving area where the air conduit and nozzle are stored when not in use. The air conduit is spring loaded in that it will expand from the storage area when the nozzle is released from its receiving area to a natural length and then can be stretched to a greater length for use. The conduit will contract to its natural length to aid in returning it to its stored condition.

7 Claims, 3 Drawing Sheets

EXTENDABLE AIR NOZZLE FOR USE WITHIN A VEHICLE'S INTERIOR

TECHNICAL FIELD

The present invention relates to generally to the delivery of a treated air stream within a transportation vehicle and more particularly to the delivery of heated or cooled air to a particular location within a passenger vehicle such as an automobile or truck.

BACKGROUND INFORMATION

Almost every transportation vehicle today, whether it be an automobile, sport utility vehicle, truck, bus, recreation vehicle, etc., has some type of heating system. These systems are generally designed to keep the occupants comfortable. Many vehicles also include apparatus that provides for cooling as well. The systems are generally designed to heat or cool the interior volume of the vehicle. Airstreams are sometimes directed toward specific surfaces within a vehicle, such as the windshield or side windows. The airstream is directed at these surfaces in order to defrost or defog them providing better visibility for the driver.

There are other potential uses of heated or cooled air inside a vehicle. One such use would be to use heated air to dry wet shoes, or boots such as for hiking or skiing. In order to use treated air for these purposes a delivery system is required. One such delivery system is shown in U.S. Pat. No. 3,280,896, issued to Elmer L. Goodson on Oct. 25, 1966. This reference is incorporated herein by reference thereto. The Goodson patent describes other uses of heated or cooled air being supplied by a vehicles heater and air conditioner (if present).

A system such as the one shown and described in the Goodson patent was difficult to use since the flexible hose and various apparatus for use therewith could not be conveniently stored in the passenger compartment of a vehicle. The present invention provides a collapsible, self-retracting hose that is easily stored within the dashboard or center console of a vehicle. The present invention also provides a nozzle fitting on the end of the air conduit hose to aid in use thereof and utilizes a push to release type of latching mechanism to maintain the collapsible hose in a stored position.

SUMMARY OF THE INVENTION

The invention provides a convenient source of low pressure air for use within a vehicle. An air conduit tube is attached by conventional means to a vehicle's air distribution system. The air conduit tube is of a flexible and collapsible type that requires minimal storage space yet can extend for use within the vehicle interior compartment. A nozzle is provided at the end of the air conduit providing a means to grasp the end and incorporated therewith an interlocking, portion that provides a latching action when the air conduit is pushed into its storage area. The latching action further provides for ease of releasing the stored air conduit by pushing on the nozzle, which then is forced out of the storage area by the air conduit's spring action.

Other features, objects and advantages of the invention are hereinafter described in the description of the best mode or preferred embodiment of the invention.

BRIEF DESCRIPTION OF THE DRAWINGS

In the drawings, like reference characters designate like parts throughout the several views, and.

BEST MODE FOR CARRYING OUT THE INVENTION

Figure 1:
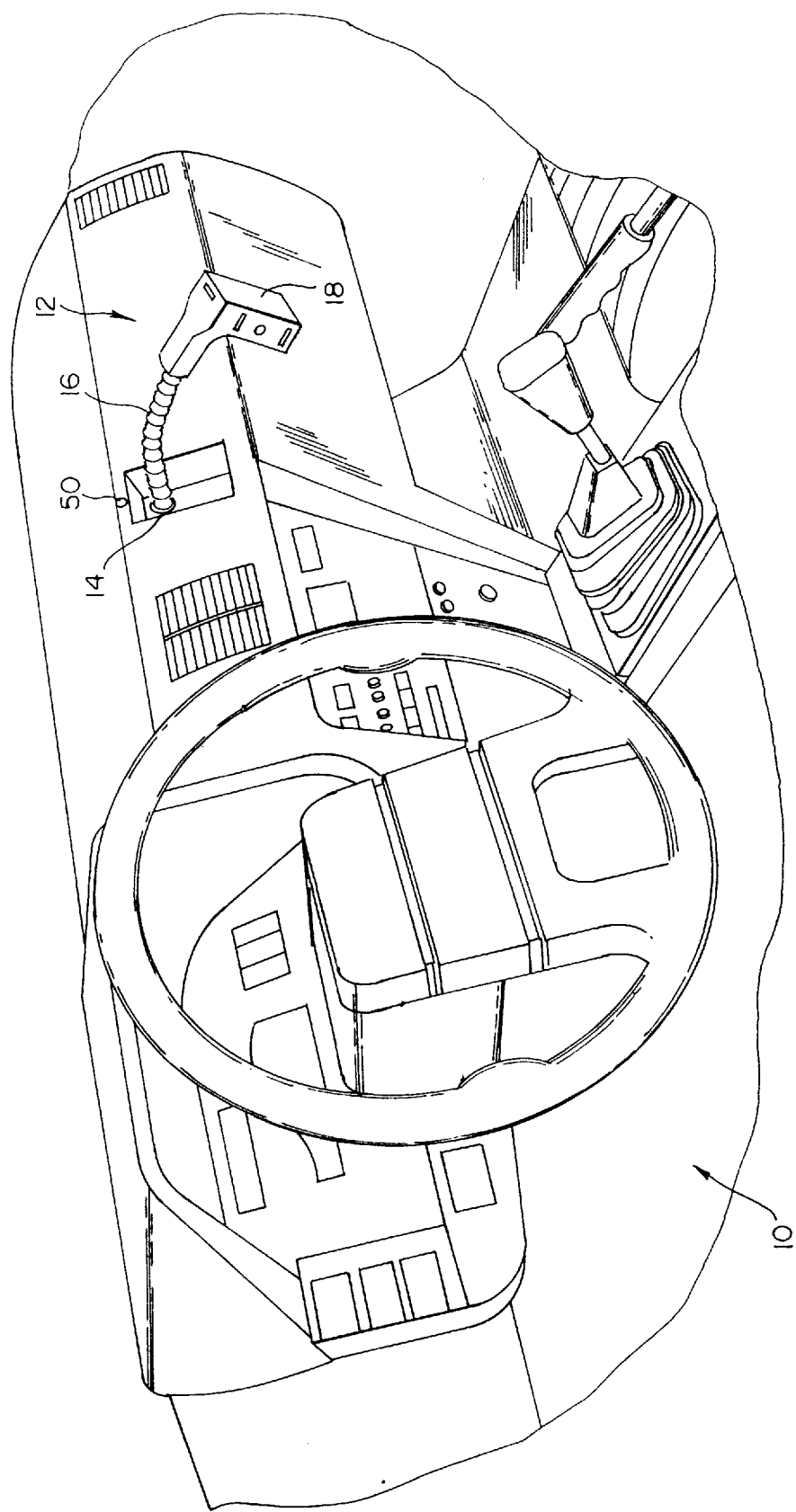
FIG. 1 is a depiction of a standard dashboard arrangement within a vehicle showing an extensible air conduit and attached nozzle according to one embodiment of the present invention.
Figure 6:
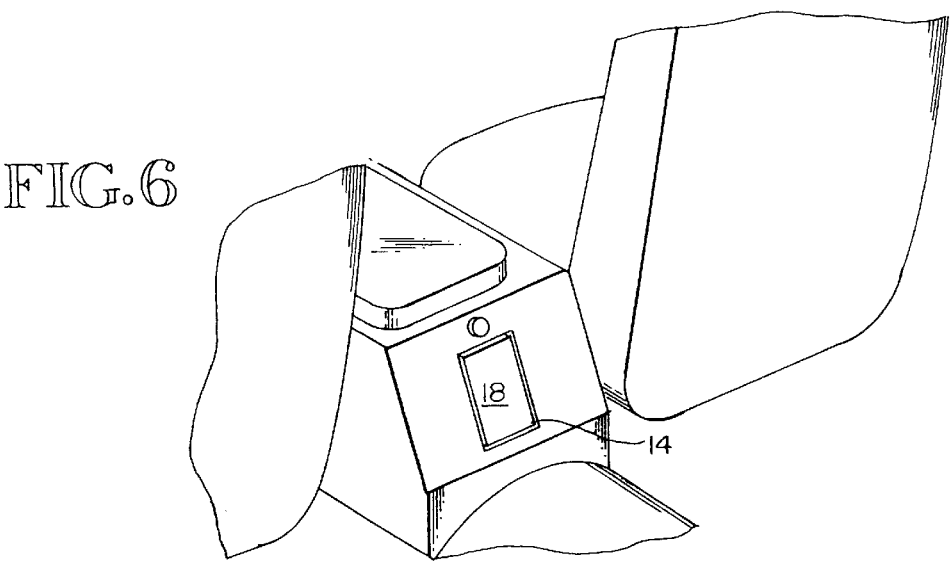
FIG. 6 is a view depicting an alternative embodiment of placement of the present invention within a vehicle.

Referring now to the several figures of the drawing and first to FIG. 1, a typical dashboard 10 is shown. An extendible air source 12 is shown partially extended from a receptacle 14 located in said dashboard 10 of a preferred embodiment of the present invention. A self-retracting and flexible air conduit 16 is shown having a nozzle 18 attached to one end thereof. Air conduit 16 is shown in a partially extended condition in FIG. 1. Air conduit 16 would generally extend four or five feet but could be made to extend further. Receptacle 14 can be placed anywhere on the face of the dash, in the glove box, or in the center console, including a rear location as shown in FIG. 6.

Figure 2:
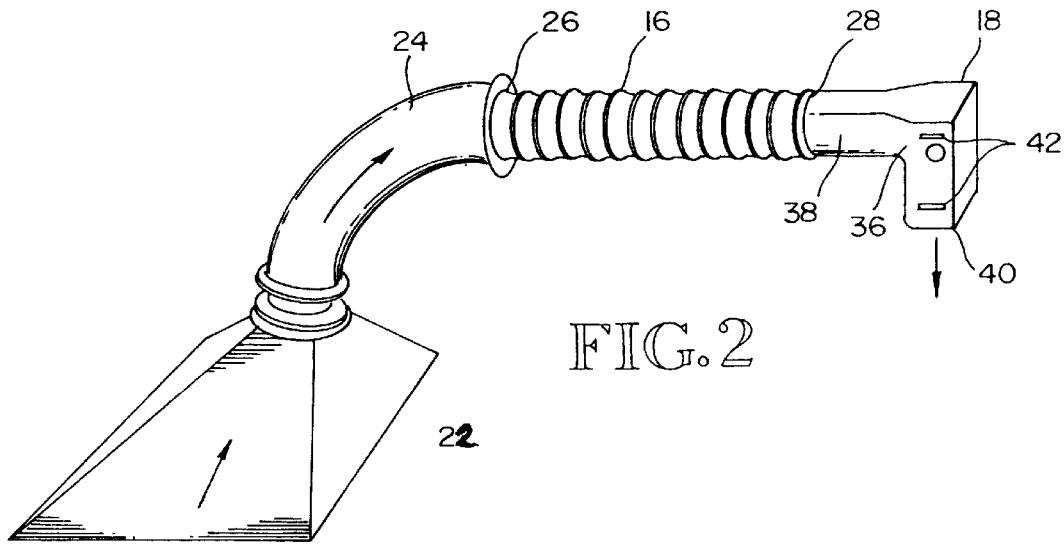
FIG. 2 shows a portion of an air collection hood and air conduit according to one embodiment of the present invention.
Figure 3:
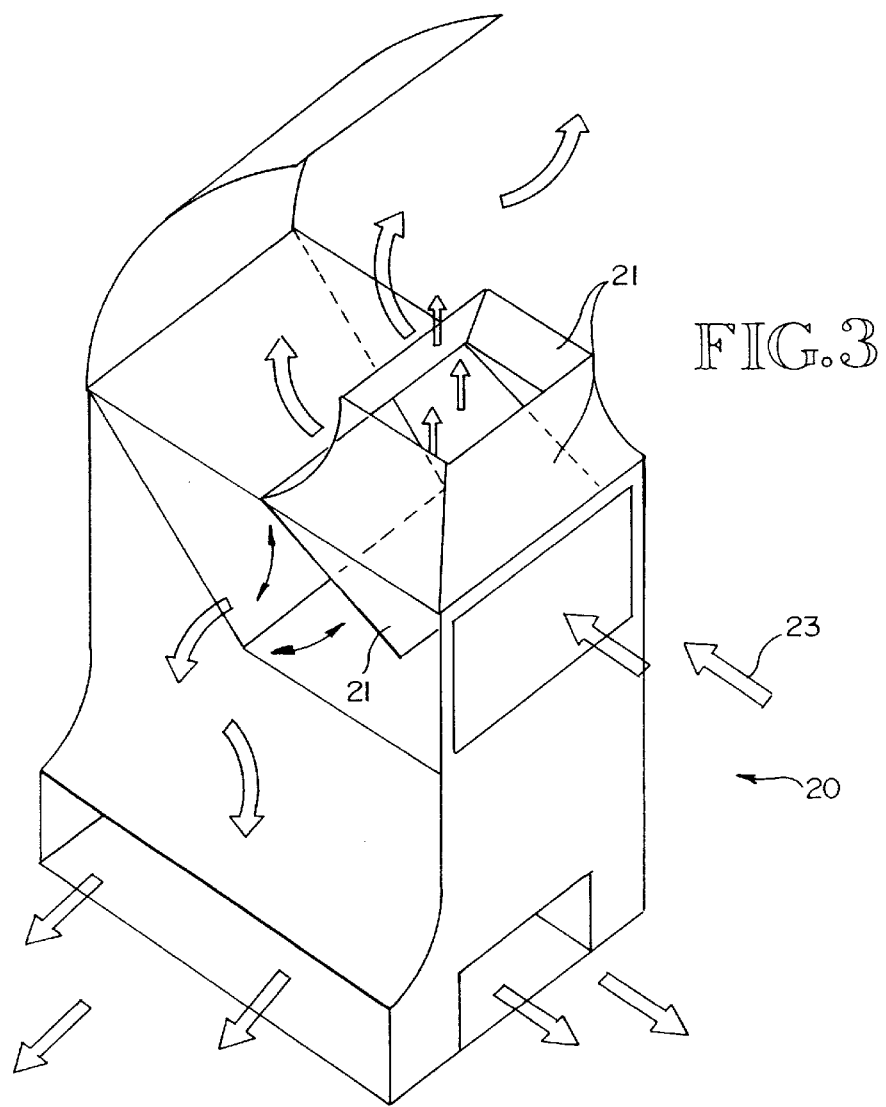
FIG. 3 is an isometric view of a typical air distribution box of a vehicle showing various air flow options, showing one embodiment of an isolation port.

FIGS. 2 and 3 show possible air paths for treated air. FIG. 3 shows an outline of a typical vehicle air distribution system 20 modified to include an isolation port 21. System 20 distributes treated air. The treated air may be heated or cooled depending on the environmental conditions present. Typical system 20 usually includes a fresh air (outside air) inlet as well as a recirculation air channel 23. Air collection hood 22 is adapted to connect in a fluid flow arrangement directly to distribution system 20 or at isolation port 21. While it is contemplated that extendible air source system 12 will be installed in new vehicles, hood 22 could be modified to attach to an existing distribution system 20 in a retrofit situation where a separate port would be placed in line between the distribution box and a blower assembly (not shown). Air hood 22 feeds treated air into an air duct 24. Guide and storage tube 24 may be made from rigid tubing or flexible tubing depending on the length and location. Guide and storage tube 24 can connect directly to air conduit 16 or to receptacle 14. If guide 24 connects to receptacle 14 than air conduit 16 connects to either the very end of guide 24 or to receptacle 14 in fluid flow manner. A first end 26 of air conduit 16 attaches to either guide tube 24 or receptacle 14 in fluid flow manner. A second end 28 of air conduit 16 connects in fluid flow manner to nozzle 18.

Figure 4:
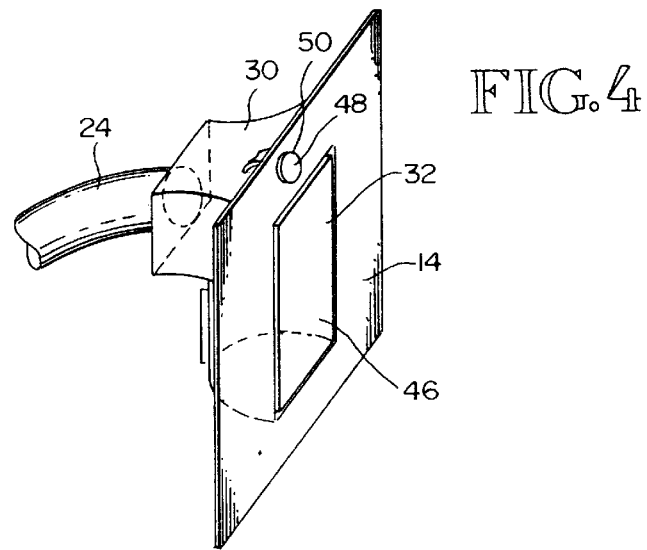
FIG. 4 is an isometric view showing an air conduit and nozzle receptacle and a portion of a guide and storage tube.
Figure 5:
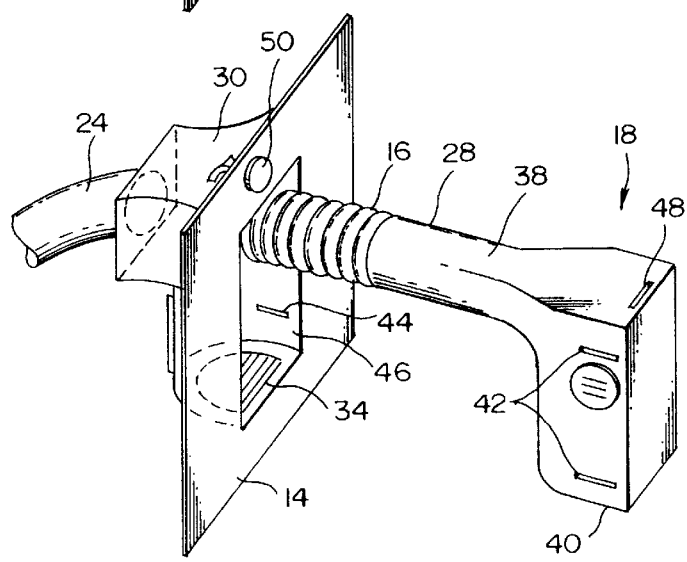
FIG. 5 is a view similar to FIG. 4 showing an air conduit with nozzle in working relationship with a receptacle.

Referring now to FIG. 4, receptacle 14 will be described. As noted above receptacle 14 may be located in almost any location within a vehicle's interior such as in the dashboard, the center console, or the glove box. Receptacle 14 serves several functions. It includes a storage chamber 30 and a nozzle receiving area 32. Referring now to FIGS. 4 and 5, receptacle also includes a louvered area 34. Louvered area 34 allows air flow to continue even when nozzle 18 is place in a stored condition within its receiving area 32. This is useful for hand free operation as would be useful in drying gloves or the like.

Nozzle 18 could be of almost any configuration, i.e., straight or bent at any given angle. In the preferred embodiment nozzle 18 includes a ninety-degree elbow 36. This configuration provides a handle portion 38 and outlet opening 40. Nozzle 18 includes at least one and preferably 4 indentations 42 or grooves. Indentations 42 interact with bosses 44 on inside surfaces 46 of nozzle receiving area 32. Bosses 44 and indentations 42 cooperate with each other to orient nozzle 18 vertically within receiving area 32. A push to release-push to lock mechanism 48 is used to retain nozzle 18 with nozzle receiving area 32, although any type of latch/release mechanism could be used. Mechanism 48 includes a button 50 which when pushed releases nozzle 18 from within nozzle receiving area 32. A spring plate ejector 52 located in the back of receiving area 32 must have enough pressure to eject nozzle 18 out of receiver 32 far enough to be grasped and pulled further out. In order to aid in grasping nozzle 18, finger hold detentions 54 are provided on either side of nozzle 18.

Air conduit 16 is designed to be both compressible and extensible. It is spring-like in nature in that it has three possible conditions of length. A first condition is in a compressed state such that when it is release it has a tendency to expand to a greater length. A second length which is a natural length which it attains when no outside pressure is exerted on it. And a third length which is variable as it is stretched out, but will recoil when released. Conduit 16 may be made in a variety of ways but it is contemplated herein to have a rubber coil in a spring-like configuration and a highly flexible web or tube wall formed integral with the spring-like portion.

Having described the presently-known best mode for carrying out the invention, and various embodiments thereto, it is to be understood that the extendable air nozzle described above and shown in the drawings could be altered in some ways without departing from what is considered to be the spirit and scope of the invention. For example, it is conceivable, and indeed, it may be likely, that the extendable air source disclosed here will be improved upon in future years. For this reason, any of the foregoing description should not be taken or interpreted in a limiting way, but instead should be used to give life and meaning to the subjoined patent claims which follow. It is the claims which define the metes and bounds of what is considered to be patented, the interpretation of which is to be made in accordance with the established doctrines of patent claim interpretation.

What is claimed is:

1. A extendable air source for use within a vehicle's interior comprising:

a vehicle's air distribution system, an attachment means for attaching an air duct to said air distribution system;

a spring loaded air conduit having one end connected to said air duct and a second end terminating as a nozzle;

a receptacle mounted within said vehicle's interior and including a receiving chamber for receiving said air conduit and a receiving port for receiving said nozzle, and an attachment means for attaching said receptacle to said air duct, a retaining means for retaining said nozzle within said receiving port when not in use, and a retaining mechanism incorporated with the receiving port acting in concert with said nozzle to retain said air conduit in said receiving chamber.

2. An apparatus according to claim 1, wherein said spring loaded air conduit having a first length in a stored condition, a second length in a partially extended state, and a third length in an in use state, in said first length condition said air conduit is in a compressed state such that when said retaining means is released said air conduit extends to said second length, said second length being said air conduit's natural length in a relaxed state, and said air conduit being, further extensible by pulling on said second end thereof to attain a maximum length in said third length state, and said air conduit then self-retracting from said third length to said second length.

3. An apparatus according to claim 1, wherein said nozzle includes a ninety-degree elbow, said nozzle further including slight depressions on opposites sides of said nozzle to facilitate the removal of said nozzle and extension of said air conduit from said receptacle.

4. An apparatus according to claim 3, wherein said nozzle includes a plurality of grooves on side portions thereof for use in aligning said nozzle in said receptacle, said receptacle having a plurality of bosses that interact with said grooves to hold said nozzle in place with said receptacle.

5. An apparatus according to claim 1, wherein said receptacle includes a louvered bottom portion in fluid flow relationship with said nozzle.

6. An apparatus according to claim 1, wherein said receptacle is located in said vehicle's dashboard.

7. An apparatus according to claim 1, wherein said receptacle is located in said vehicle's center console.

* * * * *